United States Patent [19]

Iino

[11] Patent Number: 5,016,492
[45] Date of Patent: May 21, 1991

[54] CONTINUOUSLY VARIABLE AUTOMATIC TRANSMISSION

[75] Inventor: Takashi Iino, Wako, Japan

[73] Assignee: Honda Giken Kogyo Kabushiki Kaisha, Tokyo, Japan

[21] Appl. No.: 407,716

[22] Filed: Sep. 14, 1989

Related U.S. Application Data

[63] Continuation of Ser. No. 303,428, Jan. 30, 1989, abandoned, which is a continuation of Ser. No. 21,072, Mar. 3, 1987, abandoned.

[30] Foreign Application Priority Data

Mar. 6, 1986 [JP] Japan .................................. 61-49202

[51] Int. Cl.[5] ............................................. B60K 41/22
[52] U.S. Cl. ...................................... 74/733.1; 74/862
[58] Field of Search ................. 74/731, 732, 733, 862, 74/864, 877; 60/468

[56] References Cited

U.S. PATENT DOCUMENTS

| | | | |
|---|---|---|---|
| 3,135,087 | 6/1964 | Ebert | 60/468 X |
| 3,581,498 | 6/1971 | Cudnohafsky | 60/468 X |
| 4,082,013 | 4/1978 | Dornfield et al. | 74/860 |
| 4,087,969 | 5/1978 | Takahashi et al. | 60/468 X |
| 4,096,768 | 6/1978 | Miyao | 74/865 |
| 4,170,153 | 10/1979 | Mizuno et al. | 74/864 X |
| 4,253,347 | 3/1981 | Mizuno et al. | 74/862 X |
| 4,261,229 | 4/1981 | Mizuno et al. | 74/862 X |
| 4,341,133 | 7/1982 | Sakamoto | 74/730 |
| 4,343,150 | 8/1982 | Shuler et al. | 60/468 X |
| 4,368,653 | 1/1983 | Mizuno et al. | 74/868 |
| 4,444,093 | 4/1984 | Koga | 91/488 |
| 4,478,134 | 10/1984 | Kawahara | 91/488 |
| 4,495,767 | 1/1985 | Akiyama et al. | 60/468 X |
| 4,515,257 | 4/1985 | Takano et al. | 192/0.075 |
| 4,519,790 | 5/1985 | Yamamuro et al. | 474/18 |
| 4,543,852 | 10/1985 | Svab et al. | 74/695 |
| 4,560,369 | 12/1985 | Hattori | 474/28 |
| 4,584,907 | 4/1986 | Niwa et al. | 74/866 |
| 4,603,602 | 8/1986 | Tanaka et al. | 74/866 |
| 4,631,980 | 12/1986 | Ishimori | 74/730 |
| 4,648,496 | 3/1987 | Petzold et al. | 192/0.076 |
| 4,702,128 | 10/1987 | Oshiage | 74/866 |
| 4,729,103 | 3/1988 | Oshiage | 364/424.1 |
| 4,776,165 | 10/1988 | Iino | 60/431 |
| 4,782,934 | 11/1988 | Takano | 192/0.073 |
| 4,803,900 | 2/1989 | Ohkumo | 74/860 |
| 4,923,027 | 5/1990 | Hayashi et al. | 180/219 |

FOREIGN PATENT DOCUMENTS

| | | |
|---|---|---|
| 0101151 | 2/1984 | European Pat. Off. . |
| 2363762 | 6/1975 | Fed. Rep. of Germany . |
| 2551825 | 8/1977 | Fed. Rep. of Germany ........ 74/730 |
| 52-93869 | 8/1977 | Japan . |
| 54-35558 | 3/1979 | Japan . |
| 54-134252 | 10/1979 | Japan . |
| 55-1290 | 1/1980 | Japan . |
| 55-1294 | 1/1980 | Japan . |
| 56-95722 | 8/1981 | Japan . |
| 57-70968 | 5/1982 | Japan . |
| 57-76357 | 5/1982 | Japan . |
| 57-90450 | 6/1982 | Japan . |
| 2158542 | 11/1985 | United Kingdom . |

Primary Examiner—Dwight Diehl
Attorney, Agent, or Firm—Lyon & Lyon

[57] ABSTRACT

A continuously variable automotive transmission continuously varies the speed ratio between input and output rotational speeds according to an indication of the driver's intention of acceleration or deceleration, an indication of an engine power output, and alternative selection of forward and neutral transmission positions, and also transmits the engine power output to wheels dependent on the operation of a clutch. The operating condition of the clutch is detected and fed back for the control of the transmission in order to perform speed changing operation of the transmission more quickly when the clutch is operated toward a shut-off position upon automobile deceleration than when ordinary speed changing operation is effected by the transmission.

17 Claims, 4 Drawing Sheets

CONTINUOUSLY VARIABLE AUTOMATIC TRANSMISSION

CROSS-REFERENCE TO RELATED APPLICATIONS

This application is a continuation of Applicant's co-pending application Ser. No. 303,428, filed Jan. 30, 1989 now abandoned. Application ser. No. 303,428, is in turn a continuation of Applicant's applicaton Ser. No. 021,072, filed Mar. 3, 1987 now abandoned.

BACKGROUND OF THE INVENTION

The present invention relates to a method of controlling a continuously variable automotive transmission for continuously or steplessly varying the speed ratio between input and output rotational speeds according to an indication of the driver's intention of acceleration or deceleration, an indication of an engine power output, and alternative selection of forward and neutral transmission positions, and for transmitting the engine power output to wheels dependent on the operation of a clutch.

There is known a continuously variable automotive transmission for continuously varying the speed ratio by steplessly varying the displacement of a hydraulic motor. Generally, such a known automotive transmission is designed to vary the speed ratio slowly in order to achieve smooth speed changes.

When starting the automobile within a short period of time after it has abruptly been stopped from a running condition, the automobile tends to move before a speed change toward a smaller speed ratio, i.e., deceleration, is completed since the speed ratio is varied slowly by the continuously variable automotive transmission. Therefore, the automobile may not be started smoothly under such a condition.

SUMMARY OF THE INVENTION

In view of the aforesaid shortcoming of the conventional continuously variable automotive transmission, it is an object of the present invention to provide a method of controlling a continuously variable automotive transmission to allow an automobile to be started smoothly by achieving smooth speed changes when a clutch is disengaged.

According to the present invention, the operating condition of a clutch is fed back for the control of the transmission in order to perform a speed changing operation of the transmission more quickly when the clutch is operated toward a shut-off position upon deceleration of the automobile than when ordinary speed changing operation is effected by the transmission. When the automobile is to be restarted shortly after it has abruptly stopped from a running condition, the speed changing operation is rapidly effected as the clutch is disengaged upon abrupt stoppage of the automobile, to thereby reduce the speed ratio quickly, and the automobile can thereafter be started smoothly.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

In the following description, like or corresponding reference numerals and letters denote like or corresponding parts throughout the several views.

Figure 1:
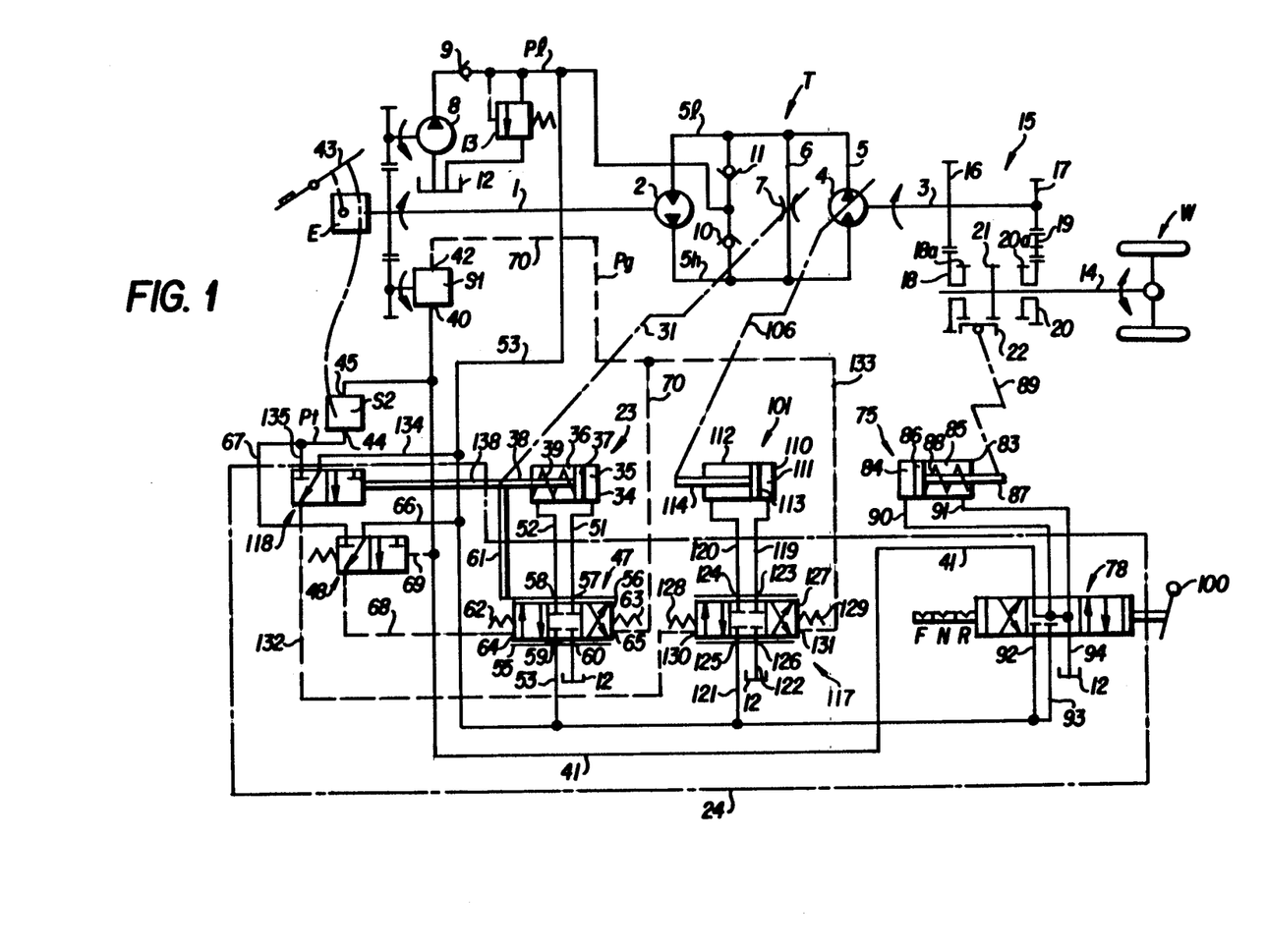
FIG. 1 is a schematic diagram of a hydraulic control circuit arrangement for carrying out a method of controlling a continuously variable automotive transmission.

As shown in FIG. 1, a hydraulically operated, continuously variable automotive transmission T includes a hydraulic pump 2 of the fixed displacement type having an input shaft 1 drivable by an automotive engine E, and a hydraulic motor 4 of the variable displacement type having a drive shaft 3 disposed coaxially with the hydraulic pump 2 for driving wheels W. The hydraulic pump 2 and the hydraulic motor 4 are interconnected by a closed hydraulic circuit 5. Specifically, the closed hydraulic circuit 5 includes a higher-pressure oil passage 5h interconnecting the outlet port of the hydraulic pump 2 and the inlet port of the hydraulic motor 4, and a lower-pressure oil passage 5l interconnecting the outlet port of the hydraulic motor 4 and the inlet port of the hydraulic pump 2.

A bypass oil passage 6 is coupled between the outlet and inlet ports of the hydraulic pump 2, i.e., the higher- and lower-pressure oil passages 5h, 5l, in bypassing relation to the hydraulic motor 4. The bypass oil passage 6 has a clutch valve 7 serving. The amount of power transmitted from the engine E to the driving wheels W by way of the drive shaft 3 may be varied by varying the position of the clutch valve 7. When the clutch valve 7 is fully opened, then the transmission of power through the transmission T is cut-off, corresponding to a fully disengaged clutch condition. When the clutch valve 7 is partially closed, power is partially transmitted through the transmission T and a partially engaged clutch condition exists. When the clutch valve 7 is fully closed, power is transmitted through the transmission T in a condition corresponding to a fully engaged clutch condition. In this manner, a clutching function is performed by varying the degree of opening of the clutch valve 7, thereby continuously varying the degree of transmission of power from the engine E through the transmission T to the drive shaft 3. Hence, a clutch means for continuously varying the transmission of power from the engine E to the drive shaft through the transmission T is provided.

A supply pump 8 which can be driven by the input shaft 1 through a gear train has an outlet port connected via check valves 9, 10, 11 to the higher- and lower-pressure oil passages 5h, 5l for supplying working oil from an oil tank 12 to the closed hydraulic circuit 5 in order to compensate for a shortage of oil in the circuit 5. A relief valve 13 is connected between the outlet port of the supply pump 8 and the oil tank 12 for releasing an excessive oil pressure discharged by the supply pump 8.

An output shaft 14 operatively coupled to the wheels W extends parallel to the drive shaft 3 of the hydraulic motor 4. Between the drive shaft 3 and the output shaft 14, there is coupled a forward/reverse selector 15 comprising first and second driver gears 16, 17 fixedly mounted on the drive shaft 3 in axially spaced relation, a first driven gear 18 rotatably supported on the output shaft 14 and meshing with the first driver gear 16, a second driven gear 20 rotatably supported on the output shaft 14 and meshing with the second driver gear 17 through an intermediate gear 19, a driven clutch gear wheel 21 fixedly mounted on the output shaft 14 and axially positioned between the first and second driven gears 18, 20, and a clutch member 22 for selectively coupling the driven clutch gear wheel 21 to the first and second driven gears 18, 20. The first and second driven gears 18, 20 have respective driver clutch gear wheels 18a, 20a on their sides near the driven clutch gear wheel 21. The clutch member 22 is movable between a position in which it interconnects the driver clutch gear wheel 18a and the driven clutch gear wheel 21 and a position in which it interconnects the driven clutch gear wheel 21 and the driver clutch gear wheel 20a.

When the driver clutch gear wheel 18a is coupled to the driven clutch gear wheel 21 as shown in FIG. 1, the output shaft 14 is rotated in a direction opposite to the direction of rotation of the drive shaft 3 to rotate the wheels W in a forward direction. When the driven clutch gear wheel 21 is coupled to the driver clutch gear wheel 20a, the output shaft 14 is rotated in the same direction as that of rotation of the drive shaft 3 to rotate the wheels W in a backward direction.

The clutch valve 7 is operated by a servo cylinder assembly 23. The forward/reverse selector 15 is operated for its gear selection by a hydraulic cylinder assembly 75. The displacement of the hydraulic motor 4 is controlled by a hydraulic cylinder assembly 101. Operation of these cylinder assemblies 23, 75, 101 is controlled by a control device 24. To the control device 24, there are connected a first detector S1 for detecting the rotational speed of the engine E which is an indication of the output of the engine E and a second detector S2 for detecting the opening of the throttle valve which is an indication of the driver's intention of acceleration or deceleration. The control device 24 controls the servo cylinder assembly 23 based on input signals delivered from the first and second detectors S1, S2 and operation of a manual selector lever 100. The control device 24 also controls the hydraulic cylinder assembly 75 based on operation of the manual selector lever 100, and controls the hydraulic cylinder assembly 101 based on the signals from the detectors S1, S2, operation of the manual selector lever 100, and the operating condition of the clutch valve 7.

The first detector S1 comprises a hydraulic governor, for example, operable in response to the rotation of the input shaft 1. More specifically, the first detector S1 is operatively coupled to the engine E through a gear train. The first detector S1 has an inlet port 40 connected to an oil passage 41 which can be supplied with a discharged hydraulic pressure Pl from the supply pump 8. The first detector S1 has an outlet port 42 for producing a hydraulic governor pressure Pg proportional to the rotation of the engine E. The hydraulic governor pressure Pg is smaller than the discharged hydraulic pressure Pl of the supply pump 8 (Pg<Pl).

The second detector S2 comprises a converter for converting a throttle valve opening to a hydraulic pressure, for example, and has an outlet port 44 for producing a hydraulic throttle pressure Pt commensurate with the operation of a device 43 for opening and closing the throttle valve. The second detector S2 also has an inlet port 45 coupled to the oil passage 41. The hydraulic throttle pressure Pt is smaller than the discharged hydraulic pressure Pl (Pt<Pl).

Figure 2A:
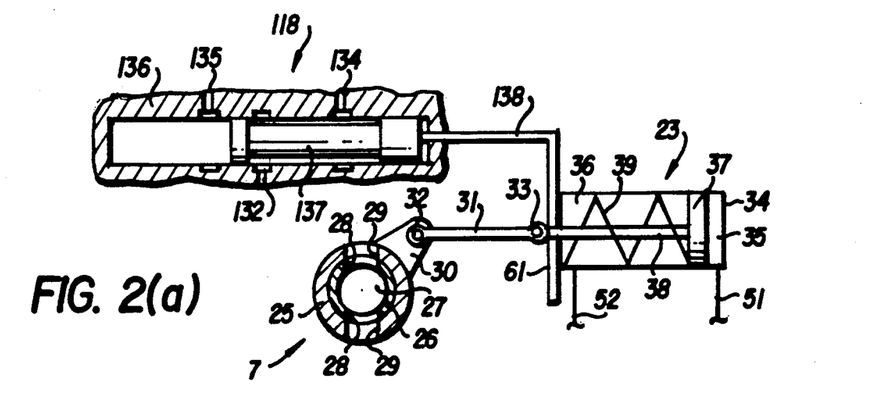
FIGS. 2(a), 2(b) and 2(c) are cross-sectional views showing the manner in which a clutch valve, a servo cylinder assembly, and a directional control valve are operated in mutually interlinked relation.
Figure 2B:
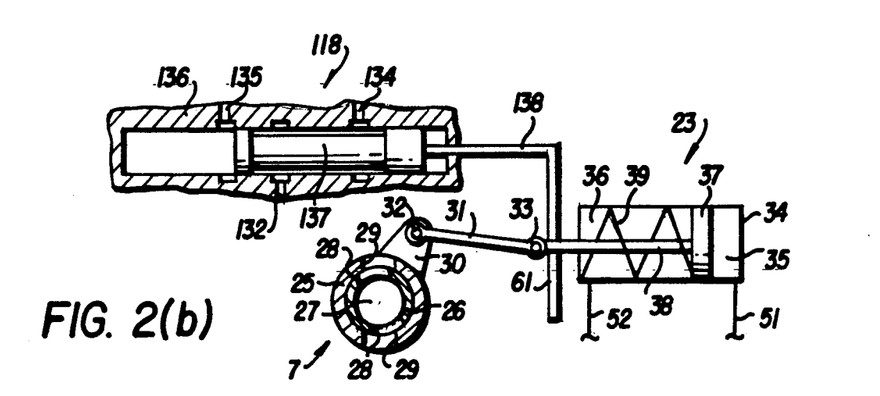
Figure 2C:
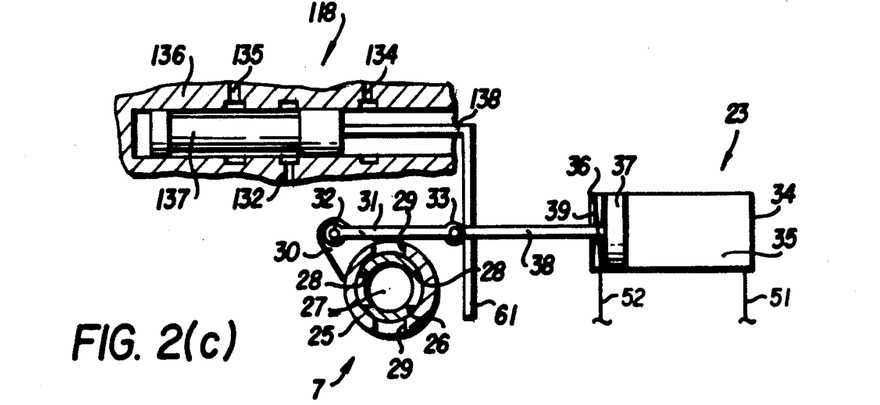

As illustrated in FIGS. 2(a) through 2(c), the clutch valve 7 comprises a fixed cylindrical member 25 and a bottomed cylindrical member 26 angularly movably fitted in the fixed cylindrical member 25. The movable cylindrical member 26 has a valve chamber 27 defined therein and held in communication with the higher-pressure oil passage 5h at all times. The movable cylindrical member 26 has a pair of diametrically opposite valve holes defined in a side wall thereof. The fixed cylindrical member 25 also has a pair of diametrically opposite bypass holes 29 defined in a side wall thereof and held in communication with the lower-pressure oil passage 5l.

When the movable cylindrical member 26 is in a certain angular position with respect to the fixed cylindrical member 25, the valve holes 28 and the bypass holes 29 are in full registry with each other to interconnect the higher- and lower-pressure oil passages 5h, 5l, thus short-circuiting the hydraulic motor 4.

An arm 30 projects radially outwardly from the movable cylindrical member 26 and is coupled via a link 31 to the servo cylinder assembly 23. More specifically, one end of the link 31 is coupled to the arm 30 by a pin 32 extending parallel to the axis of the movable cylindrical member 26, whereas the other end of the link 31 is coupled to the servo cylinder assembly 23 by a pin 33 parallel to the pin 32.

The movable cylindrical member 26 is angularly movable in the angular range of substantially 90° by the link 31 in response to operation of the servo cylinder assembly 23, for continuously varying the opening of the bypass oil passage 6 from a fully opened state to a fully closed state.

The servo cylinder assembly 23 comprises a cylinder 34, a piston 37 slidably fitted in the cylinder 34 and dividing the interior of the cylinder 34 into a head chamber 35 and a rod chamber 36, a piston rod 38 integrally joined to the piston 37 and extending movably in a fluid-tight manner through the end of the cylinder 34 adjacent to the rod chamber 36, and a spring 39 housed in the rod chamber 36 for normally urging the piston 37 to move in a direction into the head chamber 35.

The link 31 is joined by the pin 33 to the distal end of the piston rod 38. When the piston 37 is moved to the rightmost position under the resiliency of the spring 39, the clutch valve 7 is fully opened to shut off the hydraulic pressure supplied to the hydraulic motor 4 as shown in FIG. 2(a). The hydraulic power from the hydraulic pump 2 is not applied to the hydraulic motor 4. Upon leftward movement of the piston 37 against the bias of the spring 39, the valve holes 28 and the bypass holes 29 are slightly brought out of registry as shown in FIG. 2(b) to reduce the opening of the bypass oil passage 6, whereupon the clutch valve 7 is partly closed. When the piston 37 is moved to the leftmost position against the resilient forces of the spring 39, the valve holes 28 and the bypass holes 29 are relatively displaced completely out of registry as shown in FIG. 2(c). The clutch valve 7 is now fully closed to supply the entire hydraulic pressure to the hydraulic motor 4. That is, the hydraulic power from the hydraulic pump 2 is fully applied to the hydraulic motor 4.

As shown in FIG. 1, the cylinder assembly 75 comprises a cylinder 83, a piston 86 slidably fitted in the cylinder 83 and dividing the interior of the cylinder 83 into a head chamber 84 and a rod chamber 85, a piston rod 87 integrally joined to the piston 86 and extending movably in a fluid-tight manner through the end of the cylinder 83 adjacent to the rod chamber 85, and a spring 88 housed in the rod chamber 85 for normally urging the piston 86 to move in a direction into the head chamber 84.

The distal end of the piston rod 87 is fixed to a connector member 89 to which the clutch member 22 is secured. Therefore, the clutch member 22 is movable in response to operation of the piston 86 and the piston rod 87, for thereby acutating the forward/reverse selector 15. Specifically, when the piston 86 and the piston rod 87 are moved to the leftmost position, the forward gear train is selected in the forward/reverse selector 15. When the piston 86 and the piston rod 87 are moved to the rightmost position, the reverse gear train is selected in the forward/reverse selector 15. The head chamber 84 is connected to an oil passage 90, and the rod chamber 85 is connected to an oil passage 91.

Figure 3:
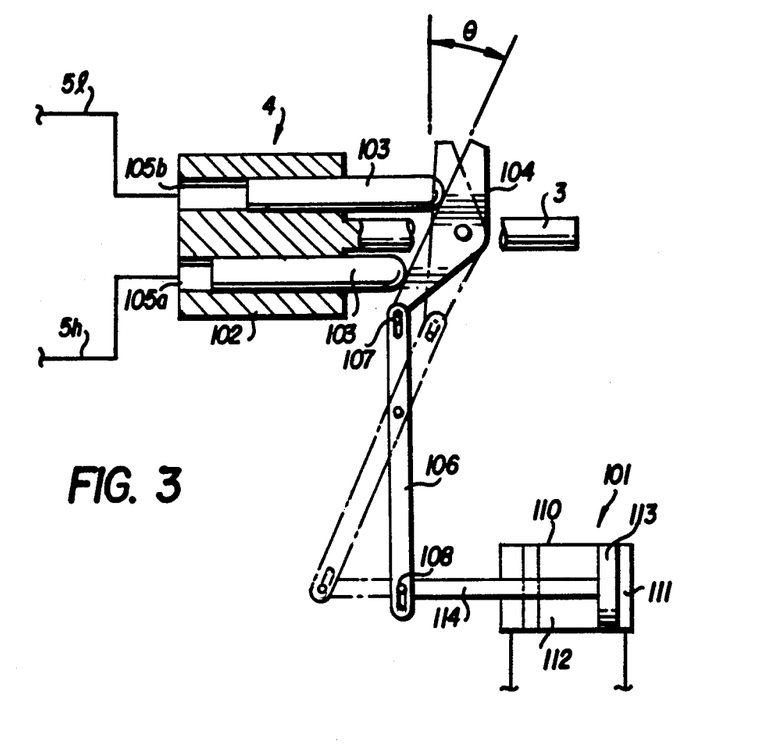
FIG. 3 is a schematic view, partly in cross section, of a hydraulic motor and a hydraulic cylinder which are operatively interconnected.

As illustrated in FIG. 3, the hydraulic motor 4 comprises a variable-displacement axial piston motor, for example. The hydraulic motor 4 includes a cylinder block 102 coupled to the drive shaft 3 and a plurality of pistons 103 slidably fitted in the cylinder block 102 and angularly spaced in an annular pattern around the axis of the drive shaft 3. A swash plate 104 for limiting the reciprocating stroke of the pistons 103 is held against the tip ends of the pistons 103, the swash plate 104 being inclined at a variable angle $\theta$. A cylinder chamber 105a defined in the cylinder block 102 and receiving one of the pistons 103 which is in an expanding stroke communicates with the higher-pressure oil passage 5h. A cylinder chamber 105b defined in the cylinder block 102 and receiving one of the pistons 103 which is in a contracting stroke communicates with the lower-pressure oil passage 51.

The hydraulic motor 4 of the above structure is known in the art. Higher-pressure oil discharged from the hydraulic pump 2 is delivered via the higher-pressure oil passage 5h into the cylinder chamber 105a, and lower-pressure oil discharged from the cylinder chamber 105b is returned via the lower-pressure oil passage 51 back to the hydraulic pump 2. During this time, the cylinder block 102 and hence the drive shaft 3 are rotated by reactive torque imposed by the swash plate 104 on the pistons 103 in the expanding stroke.

The displacement of the hydraulic motor 4 is determined by the stroke of the pistons 103. Thus, the speed ratio e between input and output rotational speeds of the transmission T can continuously be varied from a minimum level to a maximum level by changing the angle $\theta$ of the swash plate 104 from a maximum value (indicated by the one-dot-and-dash lines). The speed ratio e is given by the following equation:

$$\text{Speed ratio } e = \frac{\text{Output rotational speed}}{\text{Input rotational speed}}$$
$$= \frac{\text{Pump displacement}}{\text{Motor displacement}}$$

One end of the swash plate 104 is coupled by a pin 107 to one end of a swingable link 106, the other end of which is joined to a hydraulic cylinder assembly 101 by a pin 108 extending parallel to the pin 107.

The cylinder assembly 101 comprises a cylinder 110, a piston 113 slidably fitted in the cylinder 110 and dividing the interior of the cylinder 110 into a head chamber 111 and a rod chamber 112, and a piston rod 114 integrally joined to the piston 113 and extending movably in a fluid-tight manner through the end of the cylinder 110 adjacent to the rod chamber 112.

The distal end of the piston rod 114 is coupled to the other end of the swingable link 106 by the pin 108. When the piston 113 is moved to the rightmost position, the angle $\theta$ of the swash plate 104 is maximized to maximize the displacement of the hydraulic motor 4 for thereby reducing the speed ratio e to a minimum. Conversely, when the piston 113 is moved to the leftmost position, the swash plate angle $\theta$ is reduced to a minimum as indicated by the one-dot-and-dash lines, and so is the displacement of the hydraulic motor 4, maximizing the speed ratio e.

Referring back to FIG. 1, the control device 24 has pilot-operated valves 47, 117, directional control valves 48, 118, and a manually operated valve 78.

The pilot-operated valve 47 comprises a four-port throttling valve connected between oil passages 51, 52 communicating respectively with the head and rod chambers 35, 36 of the servo cylinder assembly 23, and an oil supply passage 53 connected to the outlet port of the supply pump 8 and an oil release passage 54 communicating with the oil tank 12. The pilot-operated valve 47 comprises a sleeve 55 and a spool 56 movably disposed therein.

The pilot-operated valve 47 has ports 57, 58 communicating with the oil passages 51, 52, respectively, and ports 59, 60 communicating with the oil supply and release passages 53, 54, respectively. The sleeve 55 is connected by a link 61 to the piston rod 38 of the servo cylinder assembly 23. Consequently, movement of the servo cylinder assembly 23 can be fed back to the pilot-operated valve 47.

The spool 56 is switchingly movable relatively to the sleeve 55 between a lefthand position in which the ports 58, 59 communicate with each other and the ports 57, 60 communicate with each other, a neutral position in which the ports 57, 58 and the ports 59, 60 are disconnected from each other, and a righthand position in which the ports 57, 59 communicate with each other and the ports 58, 60 communicate with each other. A spring 62 for normally urging the spool 56 to the right is held against the lefthand end of the spool 56, and another spring 63 for normally urging the spool 56 to the left is held against the righthand end of the spool 56. The pilot-operated valve 47 has a switching port 64 for imposing hydraulic pressure on the lefthand end of the spool 56 and another switching port 65 for imposing hydraulic pressure on the righthand end of the spool 56.

The force Fl acting on the lefthand end of the spool 56 is the sum of the spring load F11 exerted by the spring 62 and the hydraulic pressure F12 applied to the lefthand end of the spool 56 through the switching port 64 (F1=F11+F12). Likewise, the force F2 acting on the righthand end of the spool 56 is the sum of the spring load F21 exerted by the spring 63 and the hydraulic pressure F22 applied to the righthand end of the spool 56 through the switching port 65 (F2=F21+F22). The spool 56 is therefore moved with respect to the sleeve 55 when the forces F1, F2 are brought out of equilibrium.

For example, when the force F1 becomes smaller than the force F2 (F1<F2), the spool 56 is moved leftwardly into the righthand position with respect to the sleeve 55. Therefore, the hydraulic pressure Pl discharged from the supply pump 8 is introduced via the pilot-operated valve 47 into the head chamber 35 of the servo cylinder assembly 23, and the hydraulic pressure in the rod chamber 36 is released into the oil tank 12. The piston 37 and the piston rod 38 are now moved to the left to operate the clutch valve 7 in a closing direction.

As the spool 56 is moved to the left, the spring load F11 of the spring 62 is increased and the spring load F21 of the spring 63 is reduced until the forces F1, F2 are balanced (F1=F2), whereupon the leftward movement of the spool 56 is stopped. The sleeve 55 is also moved to the left by the link 61 in response to the leftward movement of the piston rod 38. Therefore, when the sleeve 55 and the spool 56 are relatively positioned in the neutral position, the oil flows between the ports 57, 59 and 58, 60 are cut off, stopping the leftward movement of the piston rod 38. As a result, the operation of the clutch valve 7 is also stopped. The movement of the sleeve 55 is also brought to a stop in timed relation to the piston rod 38.

When F1>F2, the spool 56 is moved to the right into the lefthand position with respect to the sleeve 55. The hydraulic pressure Pl from the supply pump 8 is introduced via the pilot-operated valve 47 into the rod chamber 36 of the servo cylinder assembly 23, and the hydraulic pressure in the head chamber 35 is released into the oil tank 12, thus moving the piston 37 and the piston rod 38 to the right. The clutch valve 7 is now operated in an opening direction.

Upon the rightward movement of the spool 56, the spring load F21 of the spring 63 is increased and the spring load F11 of the spring 62 is reduced until the forces F1, F2 are balanced (F1=F2), and then the rightward movement of the spool 56 is stopped. The sleeve 55 is also moved to the right in response to the rightward movement of the piston rod 38. When the sleeve 55 and the spool 56 are relatively positioned in the neutral position, the oil supply into the rod chamber 36 is cut off, stopping the rightward movement of the piston rod 38 and also the operation of the clutch valve 7. The movement of the sleeve 55 is also stopped with the piston rod 38.

The servo cylinder assembly 23 and the pilot-operated valve 47 consitute a general servomechanism for adjusting the opening of the clutch valve 7 and hence the opening of the bypass oil passage 6 through movement of the piston 37 in response to movement of the spool 56.

The directional control valve 48 comprises a three-port, two-position directional control valve disposed between an oil passage 66 communicating with the outlet port of the supply pump 8, an oil passage 67 communicating with the outlet port of the second detector S2, and a pilot oil passage 68 communicating with the switching port 64 of the pilot-operated valve 47. The directional control valve 48 is movable between a lefthand position in which the oil passage 66 communicates with the pilot oil passage 68 and a righthand position in which the oil passage 67 communicates with the pilot oil passage 68. The directional control valve 48 is brought into the righthand position when the discharged hydraulic pressure Pl of the supply pump 8 is introduced into a pilot oil passage 69 branched from the oil passage 41.

The switching port 65 of the pilot-operated valve 47 is held in communication with the outlet port 42 of the first detector S1 through a pilot oil passage 70.

When the discharged hydraulic pressure Pl of the supply pump 8 is supplied to the oil passage 41, it is also supplied to the pilot oil passage 69 to move the directional control valve 48 into the righthand position (which is a leftward movement as shown in FIG. 1) for thereby applying the hydraulic throttle pressure Pt to the switching port 64 of the pilot-operated valve 47. The other switching port 65 of the pilot-operated valve 47 is supplied with the hydraulic governor pressure Pg from the first detector S1. The pilot-operated valve 47 is operated to open or close the clutch valve 7 under the applied forces F1, F2 including the hydraulic pressures F12, F22.

When the discharged hydraulic pressure Pl is not supplied to the oil passage 41, i.e., when the hydraulic pressure in the oil passage 41 is zero, the directional control valve 48 is in the lefthand position to supply the hydraulic pressure Pl to the switching port 64 of the pilot-operated valve 47. The hydraulic governor pressure Pg from the first detector S1 is zero since the hydraulic pressure on the input port 40 is zero. Therefore, no hydraulic pressure is applied to the righthand end of the spool 56. The pilot-operated valve 47 is designed such that the force F1 tending to move the spool 56 to the right is greater than the force F2 tending to move the spool 56 to the left (F1>F2) under the above condition. The spool 56 is thus moved to the rightmost position to fully open the clutch valve 7.

The manually operated valve 78 is a six-port, three-position directional control valve disposed between the oil passages 41, 90, 91, and a pair of oil passages 92, 93 communicating with the supply oil passage 53 and a release oil passage 94 communicating with the oil tank 12. The manually operated valve 78 is manually operable to move between a forward position, a neutral position, and a reverse position. More specifically, the manually operated valve 78 is coupled to a manual selector lever 100, which is manually operated to shift the valve 78 between the forward position (lefthand position) F, the neutral position N, and the reverse position (righthand position) R.

In the forward position F, the oil passages 92, 41, the oil passages 93, 91, and the oil passage 90 and the release oil passage 94 are held in mutual communication, respectively. In the neutral position N, the oil passages 41, 90 and 91 communicate with the release oil passage 94. In the reverse position R, the oil passages 92, 41, the oil passages 93, 90, and the oil passage 91 and the release oil passage 94 are held in mutual communication, respectively.

The pilot-operated valve 117 comprises a four-port throttling valve connected between oil passages 119, 120 communicating respectively with the head and rod chambers 111, 112 of the cylinder assembly 101, and an oil supply passage 121 branched from the supply oil passage 53 which supplies the discharged hydraulic pressure Pl of the supply pump 8 and a release oil passage 122 communicating with the oil tank 12.

The pilot-operated valve 117 has ports 123, 124 communicating with the oil passages 119, 120, respectively, ports 125, 126 communicating with the oil passage 121 and the release oil passage 122, respectively, and a spool 127. The spool 127 is switchingly movable between a lefthand position in which the ports 123, 126 communicate with each other and the ports 124, 125 communicate with each other, a neutral position in which the ports 123, 126 and the ports 124, 125 are disconnected from each other, and a righthand position in which the ports 123, 125 communicate with each other and the ports 124, 126 communicate with each other. The spool 127 as it moves between the above three positions has an intermediate position in which the degree of restriction is continuously variable.

A spring 128 for normally urging the spool 127 to the right is held against the lefthand end of the spool 127, and another spring 129 for normally urging the spool 127 to the left is held against the righthand end of the spool 127. The pilot-operated valve 117 has a switching port 130 for imposing hydraulic pressure on the lefthand end of the spool 127 and another switching port 131 for imposing hydraulic pressure on the righthand end of the spool 127. The switching port 130 is connected to a pilot oil pasage 132, and the switching port 131 is connected to a pilot oil passage 133 branched from the pilot oil passage 70 communicating with the outlet port 42 of the first detector S1.

The force F3 acting on the lefthand end of the spool 127 is the sum of the spring load F31 exerted by the spring 128 and the hydraulic pressure F32 applied to the lefthand end of the spool 127 through the switching port 130 (F3=F31+F32). Likewise, the force F4 acting on the righthand end of the spool 127 is the sum of the spring load F41 exerted by the spring 129 and the hydraulic pressure F42 applied to the righthand end of the spool 127 through the switching port 131 (F4=F41+F42). The spool 127 is therefore moved when the forces F3, F4 are brought out of equilibrium.

As shown in FIGS. 1 and 2(a) through 2(c), the directional control valve 118 comprises a three-port, two position directional control valve connected between an oil passage 134 branched from the oil passage 53, an oil passage 135 communicating with the outlet port 44 of the second detector S2, and the pilot oil passage 132 communicating with the switching port 130 of the pilot-operated valve 117. The directional control valve 118 has a sleeve 136 and a spool 137 movably disposed therein, and is movable between a lefthand position in which the oil passage 134 communicates with the pilot oil passage 132, (i.e., the spool 137 is in a rightwardly position in the sleeve 136,) and a righthand position in which the oil passage 135 communicates with the pilot oil passage 132, (i.e., the spool 137 is in a leftwardly position in the sleeve 136).

The spool 137 is coupled to one end of a link 138 with its other end joined to the piston rod 38 of the servo cylinder assembly 23. When the servo cylinder assembly 23 is operated in order to open the clutch valve 7 to shut off the hydraulic power supplied to the hydraulic motor 4, the directional control valve 118 is brought into the lefthand position to communiate the oil passage 134 with the pilot oil passage 132. This condition continues until the clutch valve 7 is operated in a closing direction from the partly open position of FIG. 2(b) to a certain smaller valve opening. When the servo cylinder assembly 23 is actuated so as to close the clutch valve 7 to a degree smaller than the above certain valve opening, the directional control valve 118 is shifted to the righthand position to communicate the oil passage 135 with the pilot oil pasage 132. Therefore, while the hydraulic power is being transmitted to the hydraulic motor 4 with the clutch valve opening smaller then the certain valve opening, the hydraulic throttle pressure Pt from the second detector S2 is applied to the switching port 130 of the pilot-operated valve 117. While the hydraulic power is being shut off with the clutch valve opening exceeding the certain valve opening, the discharged hydraulic pressure Pl from the supply pump 8 is applied to the switching port 130.

When the force F3 becomes smaller than the force F4 (F3<F4), the load F31 of the spring 128 is increased and the load F41 of the spring 129 is reduced. When F3=F4, the leftward movement of the spool 127 is stopped. At this time, the working oil is introduced into the head chamber 111 of the cylinder assembly 101 and discharged from the rod chamber 112 thereof at a rate commensurate with the passage openings between the ports 123, 125 and the ports 124, 126, thereby displacing the piston 113 and the piston rod 114 to the left. When F3>F4, the spool 127 is moved to the right, increasing the load F41 of the spring 129 and reducing the load F31 of the spring 128. When F3=F4, the rightward movement of the spool 127 is put to a stop. At this time, the working oil is discharged from the head chamber 111 of the cylinder assembly 101 and introduced into the rod chamber 112 thereof at a rate commensurate with the passage openings between the ports 123, 126 and the ports 124, 125, thereby displacing the piston 113 and the piston rod 114 to the right. The pressure distribution between the head and rod chambers 111, 112 is determined by the restriction given by the pilot-operated valve 117. The piston 113 and the piston rod 114 is operated at a speed corresponding to the pressure difference between the head and rod chambers 111, 112 for controlling the displacement of the hydraulic motor 4.

Assuming that the surface areas of the opposite ends of the spool 127 of the pilot-operated valve 117 are equal to each other and represented by S, the following relationships are established:

$F32 = Pt \times S$ or $F32 = Pl \times S$,
$F42 = Pg \times S$

Since Pl>Pt and Pl>Pg, the following relationships are also established at all times:

$Pl \times S > Pt \times S$ $Pl \times S > Pg \times S$

Operation of the system shown in FIGS. 1, 2(a) through 2(c), and 3 will now be described. Before the engine E is started, the supply pump 8 remains stopped and the discharged hydraulic pressure Pl is zero. Therefore, the hydraulic governor pressure Pg and the hydraulic throttle pressure Pt are also zero. The position of the spool 56 of the pilot-operated valve 47 is determined by the set loads of the springs 62, 63, and the set loads of the springs 62, 63 are selected such that the spool 56 is displaced to the right into the lefthand position for opening the clutch valve 7. The piston 37 and the piston rod 38 of the servo cylinder assembly 23 are biased by the spring 39 to move to the right, thereby opening the clutch valve 7. The sleeve 55 of the pilot-operated valve 47 is also displaced to the right by the link 61.

It is now assumed that after the engine E has started, the manually operated valve 78 is in the neutral position N. The oil passages 41, 90, 91 communicate with the oil tank 12, and hence the hydraulic pressure in the head and rod chambers 84, 85 of the cylinder assembly 75 is released. As a consequence, the piston 86 of the cylinder assembly 75 is displaced to the leftmost position under the bias of the spring 88, and so is the clutch member 22. The forward/reverse selector 15 is thus in the forward position. The hydraulic pressure in the oil passage is nil, holding the directional control valve 48 in the lefthand position as shown in FIG. 1.

In the pilot-operated valve 47, the hydraulic pressure F12 corresponds to the hydraulic pressure Pl, and the hydraulic pressure F22 is zero because Pg=0. Since F1>F2 at all times, the spool 56 is in the lefthand position. The piston 37 of the servo cylinder assembly 23 is thus held in the rightmost position, fully opening the clutch valve 7.

Under this condition, the working oil discharged from the hydraulic pump 2 at a rate dependent on the rotational speed of the engine E flows in its entirety through the bypass oil passage 6. The hydraulic motor 4 is not driven, and no power is transmitted from the hydraulic motor 4 to the output shaft 14. The wheels W are accordingly held at rest. Even when the rotational speed of the engine E is increased by depressing the accelerator pedal of the device 43, the spool 56 of the pilot-operated valve 47 is not moved to the left since F22=0 (Pg=0). The clutch valve 7 remains fully open irrespective of how the throttle valve is opened and how the rotational speed of the engine E is varied.

At this time, the directional control valve 118 is in the lefthand position because of the fully open clutch valve 7. On the pilot-operated valve 117, F3=F31 +F32 and F4 =F41 as the hydraulic governor pressure Pg from the first detector S1 is zero. The set loads of the springs 128, 129 are determined such that F3>F4 under this condition. Thus, the spool 127 is in the lefthand position, allowing the discharged hydraulic pressure Pl from the supply pump 8 to be introduced into the rod chamber 112 of the cylinder assembly 101, with the hydraulic pressure in the head chamber 111 being released into the oil tank 12. Therefore, the piston 113 and the piston rod 114 of the cylinder assembly 101 are moved to the rightmost position, so that the angle θ of the swash plate 104 of the hydraulic motor 4 is maximized. The speed ratio e in the neutral position is now held to a minimum.

When the manual selector lever 100 is manually operated by the driver to shift the manually operated valve 78 from the neutral position N to the forward position F, the oil passages 92, 41, the oil passages 93, 91, and the oil passage 90 and the release oil passage 94 are brought into mutual communication. Therefore, the discharged hydraulic pressure Pl is supplied to the rod chamber 85 of the cylinder assembly 75 while the head chamber 84 remains released into the oil tank 12. The piston 86 thus remains in the leftmost position, and the forward/reverse selector 15 remains in the forward position. The discharged hydraulic pressure Pl is also supplied to the oil passage 41.

The directional control valve 48 is moved to the righthand position on account of the hydraulic pressure Pl supplied to the pilot oil passage 69, whereupon the switching port 64 of the pilot-operated valve 47 is supplied with tho hydraulic throttle pressure Pt from the second detector S2. The hydraulic governor pressure Pg from the first detector S1 is supplied via the pilot oil passage 70 to the switching port 65 of the pilot-operated valve 47. Therefore, the pilot-operated valve 47 is operated under the hydraulic throttle pressure Pt and the hydraulic governor pressure Pg, and the clutch valve 7 is operated accordingly.

While the engine E is idling with the automobile at rest and the device 43 not acted upon, the first detector S1 produces a hydraulic governor pressure Pg corresponding to the idling rotational speed of the engine E, and the second detector S2 produces a hydraulic throttle pressure Pt commensurate with the throttle valve opening "0". The pilot-operated valve 47 is arranged in advance such that F1=F2 in the position in which the spool 56 is displaced a certain distance to the left from the rightmost position. Thus, the piston rod 38 of the servo cylinder assembly 23 is also moved to the left by the same distance and then stopped. The clutch valve 7 is now partly closed, i.e., the clutch is partly engaged.

During the engine idling, the switching port 131 of the pilot-operated valve 117 is supplied with the hydraulic governor pressure Pg corresponding to the idling rotational speed of the engine E, and the switching port 130 is supplied with the discharged hydraulic pressure Pl. The set loads F31, F41 of the springs 28, 129 are determined such that F3>F4 at all times. Therefore, the spool 127 is in the lefthand position.

The head chamber 111 of the cylinder assembly 101 communicates with the oil tank 12, and the discharged hydraulic pressure Pl is applied to the rod chamber 112. The piston 113 and the piston rod 114 are moved to the rightmost position, so that the angle θ of the swash plate 104 is at maximum, thus minimizing the speed ratio e.

By depressing the accelerator pedal to start moving the automobile, the throttle valve is opened to increase the hydraulic throttle pressure Pt. As the rotational speed of the engine E increases, the hydraulic governor pressure Pg from the first detector S1 is raised to increase the force F2 so that the spool 56 of the pilot-operated valve 47 is moved to the left under the condition F2>F1. The hydraulic pressure Pl discharged by the supply pump 8 is now introduced into the head chamber 35 and the rod chamber 36 communicates with the oil tank 12 or is vented to atmosphere, moving the piston 37 and the piston rod 38 to the left against the resiliency of the spring 39. The clutch valve 7 is gradually operated in the closing direction, starting to actuate the hydraulic motor 4 under the hydraulic pressure supplied from the hydraulic pump 2.

Under the forces F1, F2 applied, the spool 56 continues to move to the left until it is stopped in the leftmost position. The clutch valve 7 is fully closed to permit the hydraulic motor 4 to be driven by the entire hydraulic pressure from the hydraulic pump 2. Since the forward/reverse selector 15 is in the forward position at this time, the automobile starts moving in the forward direction in response to the rotation of the hydraulic motor 4.

When the clutch valve 7 is shifted from the partly closed position of FIG. 2(b) to the fully closed position of FIG. 2(c) at this time, the directional control valve 118 is moved to the righthand position thereby to allow the hydraulic throttle pressure Pt to act on the switching port 130 of the pilot-operated valve 117. The force F3 acting on the pilot-operated valve 117 now increases as the hydraulic pressure F32 increases. The pilot-operated valve 117 is arranged in advance such that F3>F4 under this condition. The speed ratio e remains minimum as indicated by the curve A or E in FIG. 4, as in the engine idling mode.

As the engine rotational speed further increases, the hydraulic governor pressure Pg is raised to increase the force F4 on the pilot-operated valve 117. As long as F3>F4 or F3=F4, the spool 127 is in the lefthand position or the neutral position, and hence the piston 113 and the piston rod 114 of the cylinder assembly 101 remain in the rightmost position. The speed ratio e is held to minimum. As the engine rotational speed picks up, however, the automobile speed increases according to the curve B or F in FIG. 4.

When the condition F3<F4 is reached as a result of a further increase in the engine rotational speed, the spool 127 of the pilot-operated valve 117 is moved to the left into the righthand position to supply the discharged hydraulic pressure Pl to the head chamber 111 of the cylinder assembly 101 and release the hydraulic pressure from the rod chamber 112 to the oil tank 12. Therefore, the piston 113 and the piston rod 114 are moved leftwardly to angularly move the swash plate 104 in the direction to reduce the angle θ or increase the speed ratio e, thereby increasing the automobile speed. At this time, the engine load is increased to control an increase in the engine rotational speed for thereby keeping the engine rotational speed at a substantially constant level, as indicated by the curve C or G in FIG. 4.

Figure 4:
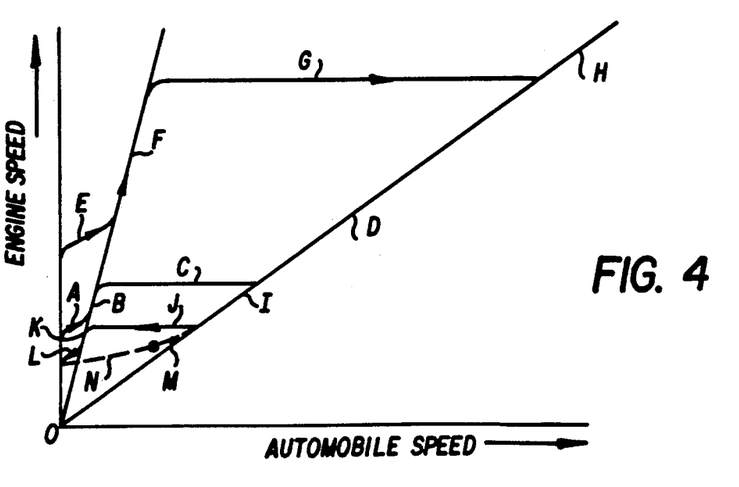
FIG. 4 is a graph illustrating speed change characteristics.

If the accelerator pedal is continuously depressed even after the speed ratio e has increased to its maximum value, the engine rotational speed is increased until the engine power output and the engine load are balanced, and so is the automobile speed. When the engine power output and the engine load are in equilibrium, the automobile runs in a normal or steady condition as indicated by the curve D or H.

The relationship between the engine rotational speed and the automobile speed from an automobile start to a normal running condition when the accelerator pedal is depressed to a smaller degree for slowly starting the automobile is different from the relationship when the accelerator pedal is depressed to a larger degree for quickly starting the automobile. At a slow start, the relationship varies from A to B to C to D to H as shown in FIG. 4, and at a rapid start, the relationship follows the curves E to F to G to H in FIG. 4.

As can be seen from FIG. 4, the engine rotational speed on a speed change is established dependent on the degree to which the accelerator pedal is depressed, and speed change control is effected in order to keep the engine rotational speed constant.

When the accelerator pedal is released from the driver's foot to bring the automobile to a slow stop from the normal running condition, the hydraulic throttle pressure Pt is lowered to a low value corresponding to the throttle valve opening "0". Then, F3<F4 on the pilot-operated valve 117, and hence the speed ratio e is increased to a maximum. The hydraulic motor 4 is driven back by inertia of the engine load, and the hydraulic pump 2 is rotated by oil discharged from the hydraulic motor 4. At the same time, the engine E coupled to the hydraulic pump 2 is also rotated to exert engine braking for thereby decelerating the automobile.

The relationship between the engine rotational speed and the automobile speed at this time varies from H to D to I to J to K to L in FIG. 4. More specifically, automobile deceleration due to engine braking while the speed ratio e remains at maximum is indicated by the curves H to D to I in FIG. 4. As the engine speed decreases, the condition F3>F4 is reached on the pilot-operated valve 117, whereupon the speed ratio e is reduced. At this time, the engine braking load is increased to limit a reduction in the engine speed, so that the engine speed becomes substantially constant as represented by J in FIG. 4. When the speed ratio e is lowered to a minimum, the engine rotational speed is reduced with the automobile speed as indicated by K in FIG. 4. Upon a further reduction in the engine speed, the condition F1>F2 is reached on the pilot-operated valve 47 to operate the clutch valve 7 in the opening direction. The automobile speed is now indicated by the curve L. The hydraulic power transmission between the hydraulic pump 2 and the hydraulic motor 4 is shut off to allow the automobile to stop. At this time, the engine E is idling, and the clutch valve 7 is opened from the fully closed condition of FIG. 2(c) to the partly closed condition of FIG. 2(b). The directional control valve 118 is moved to the lefthand position. The discharged hydraulic pressure Pl is now applied to the lefthand end of the spool 127 of the pilot-operated valve 117 to keep the speed ratio e at minimum.

It is assumed that the automobile is abruptly stopped while it is running with the manually operated valve 78 in the forward position F. In this case, the clutch valve 7 starts opening before the speed changing operation of the transmission T is completed. This is because clutch operation is better in response and starts earlier whereas the transmission operation is slower for smooth speed changes.

The above condition will be described in detail with reference to FIGS. 1 and 4. When the automobile is abruptly braked with the accelerator pedal released from the driver's foot, the second detector S2 produces a low hydraulic throttle pressure Pt corresponding to the throttle valve opening "0". The condition F3<F4 is reached on the pilot-operated valve 117, and the piston 113 of the cylinder assembly 101 is moved to the left to thereby maximize the speed ratio e. Then, engine braking and wheel braking become effective to quickly decelerate the automobile according to the curves H to D to I in FIG. 4. As the engine rotational speed is lowered, F3 becomes larger than F4 on the pilot-operated valve 117, and the speed ratio e is slowly reduced with respect to the reduction of the engine rotational speed as indicated by M in FIG. 4. The engine rotational speed is reduced without an increase in the engine braking load.

As the engine rotational speed further goes down, F1 becomes larger than F2 on the pilot-operated valve 47 to operate the clutch valve 7 in the opening direction. In response to the opening of the clutch valve 7, the directional control valve 118 is displaced to the lefthand position to allow the discharged hydraulic pressure Pl to act on the lefthand end of the spool 127 of the pilot-operated valve 117. The spool 127 is quickly moved to the right, and the piston 113 of the cylinder assembly 101 is moved to the rightmost position. The speed ratio e is reduced to a minimum upon stoppage of the automobile, as indicated by N in FIG. 4.

When the manually operated valve 78 is shifted from the forward position F to the neutral position N after the automobile has stopped, the hydraulic pressures are released from the chambers 84, 85 of the cylinder assembly 75. The piston 86 remains biased to the leftmost position by the spring 88. Accordingly, the forward- /reverse selector 15 is continuously kept in the forward position. Since the hydraulic pressure in the oil passage 41 is nil, the clutch valve 7 is fully opened.

While the engine is idling in the forward position F, the speed ratio e is at minimum. If the manually operated valve 78 is shifted to the neutral position N under this condition, the speed ratio e remains at minimum. Therefore, when the manually operated valve 78 is shifted from the neutral position N to the forward position F in order to get the automobile started, the speed ratio e required for an automobile start is immediately obtained to make a smooth start.

When the manually operated valve 78 is shifted from the neutral position N to the reverse position R while the automobile is at rest, the oil passages 92, 41, the oil passages 93, 90, and the oil passage 91 and the release oil passage 94 are brought into mutual communication. The head chamber 84 of the cylinder assembly 75 is supplied with the discharged hydraulic pressure Pl, and the hydraulic pressure is released from the rod chamber 85. Consequently, the piston 86 is moved to the right to displace the clutch member 22 of the forward/reverse selector 15 rightwardly out of mesh with the driver clutch gear wheel 18a into mesh with the driver clutch gear wheel 20a.

Since the discharged hydraulic pressure Pl is supplied to the oil passage 41, the clutch valve 7 is operated under the hydraulic throttle pressure Pt and the hydraulic governor pressure Pg. During engine idling, in particular, the clutch is partly engaged.

At this time, the cylinder assembly 101 operates in the same manner as when the manually operated valve 78 is shifted from the neutral position N to the forward position F, so that the speed ratio e is minimized.

As the device 43 is actuated to open the throttle valve so as to move the automobile backwards, the clutch valve 7 is slowly closed in the same manner as when the automobile is moved forwardly. The hydraulic motor 4 starts being driven to move the automobile backwards. The pilot-operated valve 117 operates to make speed changes in the same manner as when the automobile is moved forwardly.

For stopping the automobile while the valve 78 is in the reverse position R, the clutch valve 7 and the swash plate 104 operate in the same way as when the automobile is stopped during forward movement, with the forward/reverse selector 15 in the reverse position. If the manually operated valve 78 is shifted from the reverse position R to the neutral position N after the automobile has stopped, the chambers 84, 85 of the cylinder assembly 75 are brought into communication with the oil tank 12, with the result that the piston 86 is moved from the rightmost position to the leftmost position, shifting the forward/reverse selector 15 from the reverse position. At this time, the hydraulic pressure in the oil passage 41 is zero, and the clutch valve 7 is fully opened. Therefore, the clutch member 22 can smoothly be released out of mesh with the driver clutch gear wheel 20a. The speed ratio e is at minimum when the engine is idling in the reverse position R in the same manner as when the valve 78 is shifted from the forward position F to the neutral position N.

In the above embodiment, when the opening of the clutch valve 7 is in excess of a certain level, the discharged hydraulic pressure Pl is applied, instead of the hydraulic throttle pressure Pt, to the lefthand end of the spool 127 of the pilot-operated valve 117 to make the rightward force F3 larger than the leftward force F4 for thereby moving the piston 113 of the cylinder assembly 101 to the rightmost position to minimize the speed ratio e. Conversely, when the clutch valve 7 is opened beyond a certain opening, the hydraulic pressure acting on the righthand end of the spool 127 may be reduced for performing the same operation as described above. Such an alternative will be described below as another embodiment of the present invention.

Figure 5:
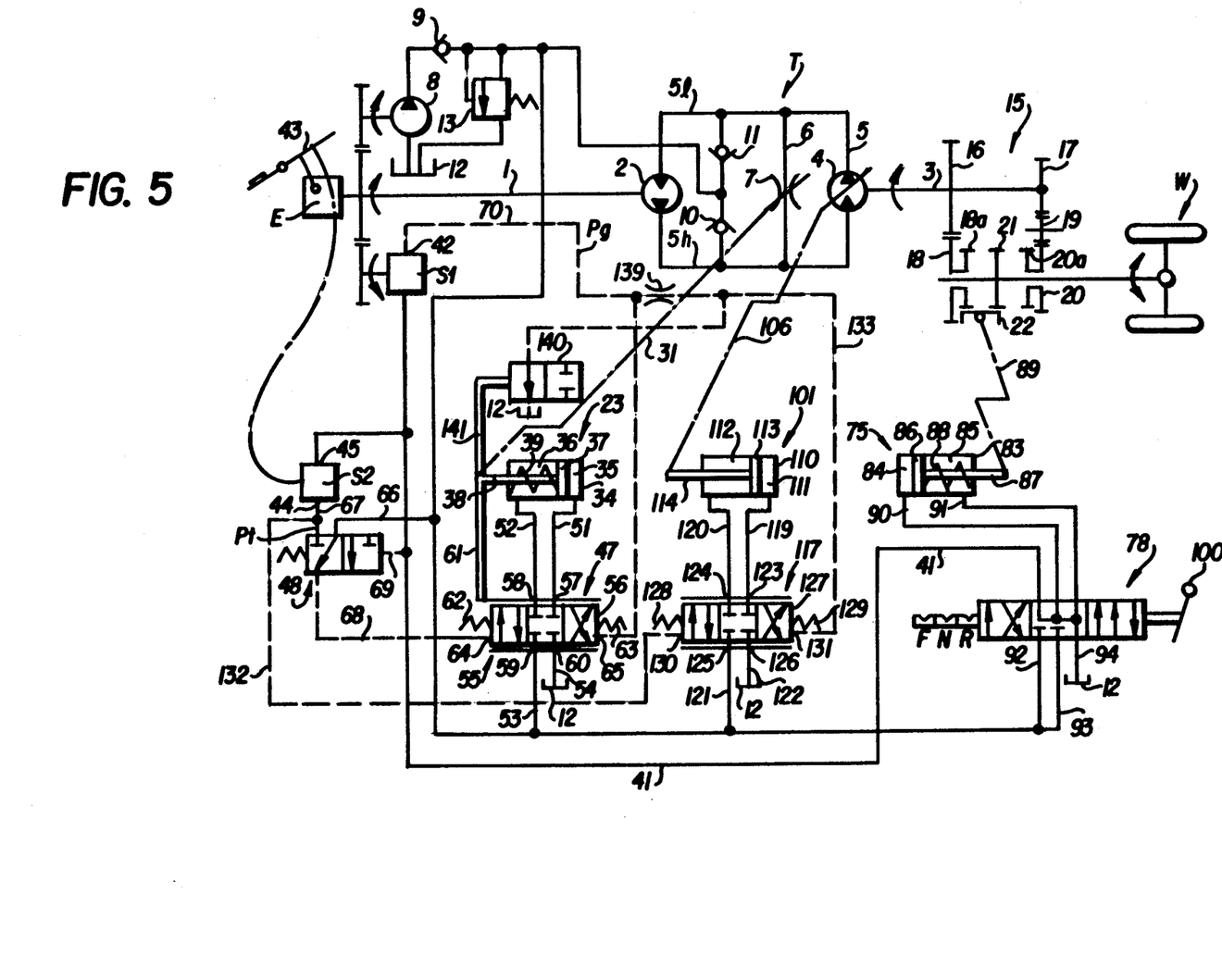
FIG. 5 is a schematic diagram of another hydraulic control circuit arrangement for carrying out a method of controlling a continuously variable automotive transmission.

FIG. 5 shows another embodiment of the present invention. Those parts in FIG. 5 which are identical or correspond to those of FIG. 1 are denoted by identical or corresponding reference characters.

In the embodiment of FIG. 5, the directional control valve 118 of the preceding embodiment is dispensed with, and the pilot oil passage 132 branched from the oil passage 67 communicating with the outlet port 44 of the second detector S2 is connected to the switching port 130 of the pilot-operated valve 117, while the pilot oil passage 133 communicating with the switching port 131 has a restriction 139. In addition, an on-off or shut-off valve 140 is connected to the pilot oil passage 133 between the restriction 139 and the switching port 131, the on-off valve 140 being movable between a lefthand position in which the pilot oil passage 133 communicates with the oil tank 12 and a righthand position in which the pilot oil passage 133 is disconnected from the oil tank 12. The on-off valve 140 is coupled by a link 141 to the piston rod 38 of the servo cylinder assembly 23 so as to operate with the servo cylinder assembly 23. The on-off valve 140 is moved to the lefthand position when the piston rod 38 is moved to the right in order to open the clutch valve 7 beyond a certain opening.

When the on-off valve 140 is displaced to the lefthand position, the hydraulic governor pressure Pg acting on the switching port 131 of the pilot-operated valve 117 is reduced to substantially zero, so that $F42 \approx 0$. Therefore, F3 becomes larger than F4 on the pilot-operated valve 117 to reduce the speed ratio e to a minimum. When the on-off valve 140 is in the righthand position, the switching port 131 is supplied with the hydraulic governor pressure Pg which is commensurate with the engine rotational speed. The transmission T now effects normal speed changing operation under the hydraulic governor pressure Pg and the hydraulic throttle pressure Pt.

In the embodiment of FIG. 5, as the clutch valve 7 is opened beyond a certain opening, the speed ratio e is minimized to achieve the same advantages as those of the preceding embodiment.

According to still another embodiment of the present invention, the control device 24 may be constructed using a microcomputer or the like. More specifically the operation of an actuator employed in place of the cylinder assembly 101 may be controlled by a microcomputer which is programmed to electrically detect the rotational speed of the engine, the throttle valve opening, the shifted position of the valve 78, and the selected position of the forward/reverse selector 15, and to process various signals to produce the same mechanical movements as described above in the aforesaid embodiments. The cylinder assembly 101 which is a hydraulic actuator may be replaced with an electric actuator such as a stepping motor, a linear stepping motor, a DC motor, or an AC motor dependent on the construction of the control device 24. The pilot-operated valve 117 and the manually operated valve 78 may comprise an electro-hydraulic servovalve or a solenoid-operated proportional pressure control valve.

The present invention is not limited to the hydraulically operated, continuously variable automotive transmission comprising the fixed-displacement hydraulic pump 2 and the variable-displacement hydraulic motor. The principles of the present invention are applicable to a transmission comprising a variable-displacement hydraulic pump and a fixed-displacement hydraulic motor, or a transmission comprising a variable-displacement hydraulic pump and a variable-displacement hydraulic motor.

While the forward/reverse selector 15 is of the dog clutch type, it may be a combination of a planetary gear and a wet-type clutch.

While the discharged hydraulic pressure Pl from the supply pump 8 is employed in the above embodiments as the working pressure on the cylinder assembly 101, a high hydraulic pressure in the closed hydraulic circuit 5 may be utilized as the working pressure for producing a larger working force.

The detection of the throttle valve opening or the accelerator pedal depression as an indication of the driver's intention of acceleration and deceleration may be replaced with the detection of the vacuum developed in the intake pipe of the engine, and the amount of fuel supplied, and the engine torque may be detected instead of the engine rotational speed as an indication of the engine power output.

The present invention is not limited to hydraulically operated, continuously variable transmissions, but is also applicable to continuously variable automotive transmissions of other types such as a belt-drive type or a toroidal type.

With the present invention, as described above, the operating condition of a clutch is fed back for transmission control in order to perform speed changing operation more quickly when the clutch is operated toward a shut-off position upon automobile deceleration than when ordinary speed changing operation is effected. Therefore, when the automobile is to be restarted shortly after it has abruptly stopped from a running condition, automobile deceleration can rapidly be completed and the automobile can be started smoothly.

Although certain preferred embodiments have been shown and described, it should be understood that many changes and modifications may be made therein without departing from the scope of the appended claims.

I claim:

1. A method of controlling a continuously variable automotive transmission for continuously varying the speed ratio between input and output rotational speeds according to an indication of the driver's intention of acceleration or deceleration, an indication of an engine power output, and alternative selection of forward and neutral transmission positions, and for transmitting the engine power output to wheels dependent on the operation of a clutch means, said method comprising the step of:
  detecting and feeding back the operating condition of said clutch means for the control of the transmission in order to perform speed changing operation of the transmission more quickly when the clutch means is operated toward a shut-off position upon automobile deceleration than when ordinary speed changing operation is effected by the transmission.

2. A method of controlling a continuously variable transmission according to claim 1, wherein said clutch means comprises clutch valve means for selectively varying the transmission of engine power to said wheels.

3. A method of controlling a continuously variable transmission according to claim 1, wherein said clutch means comprises clutch valve means for selectively varying the transmission of engine power to said wheels in a continuously variable transmission of the type having a hydraulic pump and a hydraulic motor interconnected by a closed hydraulic circuit, said clutch valve means operating between a shut-off state in which said closed hydraulic circuit is short-circuited to shut off the transmission of said engine power to said wheels and a transmission state in which said closed hydraulic circuit is not shut off and said engine power is transmitted to said wheels.

4. A method of controlling a continuously variable transmission according to claim 3, wherein said clutch valve means is continuously variable between said shut off state and said transmission state to continuously vary the degree of transmission of engine power to said wheels.

5. A method of controlling a continuously variable transmission according to claim 1, wherein said clutch means is a clutch valve.

6. A method of controlling a continuously variable transmission in a vehicle for continuously varying the speed ratio between input and output rotational speeds according to an indication of the driver's intention of acceleration or deceleration, an indication of an engine power output, and alternative selection of forward and neutral transmission positions, and for transmitting the engine power output to a wheel dependent on the operation of a clutch means, said method comprising the step of:
  detecting and feeding back the operating condition of said clutch means for the control of the transmission in order to perform speed changing operation of the transmission more quickly when the clutch means is operated during vehicle deceleration toward a position where the engine power output is shut off from said wheel than when ordinary speed changing operation is effected by the transmission.

7. A method of controlling a continuously variable transmission in a vehicle with an engine for continuously varying a speed ratio of said transmission according to an indication of a driver's intention of acceleration of deceleration and an indication of engine power output, and for transmitting the engine power output to a wheel dependent on the operation of a clutch means which is operable to selectively transmit and shut-off said engine power to said wheel, the method comprising the steps of:
  detecting and feeding back the operating condition of said clutch means for the control of the transmission, and
  performing a speed changing operation of the transmission more quickly when the clutch means is operated toward said shut-off condition during a condition of vehicle deceleration than when an ordinary speed changing operation is effected by the transmission.

8. A method of controlling a continuously variable transmission according to claim 7, wherein said clutch means is continuously variable between said condition where engine power is transmitted and said condition where engine power is shut-off.

9. A method of controlling a continuously variable transmission in a vehicle with an engine for continuously varying a speed ratio of said transmission according to an indication of a driver's intention of acceleration or deceleration and an indication of engine power output, and for transmitting the engine power output to a wheel dependent on the operation of a clutch means which is operable between a power transmission state in which said engine power is transmitted to said wheel and a shut-off state in which said engine power is not transmitted to said wheel, the method comprising the steps of:

detecting the operating condition of said clutch means, and     performing a speed changing operation of the transmission more quickly when the vehicle is decelerating and the clutch means is operated in such a manner as to begin to shut-off said transmission of engine power than when an ordinary speed changing operation is effected by the transmission.

10. A method of controlling a continuously variable transmission according to claim 9, wherein said clutch means is continuously variable between said power transmission state and said shut-off state.

11. A method of controlling a continuously variable transmission in a vehicle with an engine for continuously varying a speed ratio of said transmission according to an indication of a driver's intention of acceleration or deceleration and an indication of engine power output, and for transmitting the engine power output to a wheel dependent on the operation of a clutch means which is operable between a power transmission state in which said engine power is transmitted to said wheel and a shut-off state in which said engine power is not transmitted to said wheel, said speed ratio being varied by a speed ratio varying means responsive to a control force for varying the speed of change of said speed ratio, the method comprising the steps of:

detecting and feeding back the operating condition of said clutch means,     applying said control force to said speed ratio varying means, said control force being commensurate with the position of said clutch, and     performing a speed changing operation of the transmission more quickly when the vehicle is deceleration and the clutch means is operated toward said shut-off state than when an ordinary speed changing operation is effected by the transmission.

12. A control system according to claim 11, wherein said step of applying said control force includes applying said control force comprising a discharge hydraulic pressure when said clutch means is moved beyond a certain amount toward shut-off state during vehicle deceleration.

13. A control system according to claim 11, wherein said step of applying said control force includes applying said control force comprising a release oil tank pressure when said clutch means is moved beyond a certain amount toward said shut-off state during vehicle deceleration.

14. A method of controlling a continuously variable transmission in a vehicle with an engine for continuously varying a speed ratio of said transmission according to an indication of a driver's intention of acceleration or deceleration and an indication of engine power output, and for selectively transmitting said engine power output to a wheel of said vehicle dependent on the operation of a clutch means for varying the degree of transmission of said engine power output, said speed ratio being controlled by a ration control means for varying the speed ratio of said transmission according to a difference between a first control signal and a second control signal, the method comprising the steps of,     detecting the operating condition of said clutch means, and     applying said first and second control signals to said speed ratio varying means, said first control signal being commensurate with the operating condition of said clutch means, and performing a speed changing operation of the transmission more quickly when the vehicle is decelerating and the clutch means is operated in a manner so as to begin the shut-off said transmission of engine power output than when an ordinary speed changing operation is effected by the transmission.

15. A control system according to claim 14, wherein said step of applying said first and second control signals and performing a speed changing operation includes applying said first control signal comprising a discharge hydraulic pressure when said clutch means is moved beyond a certain amount toward said shut-off condition during vehicle deceleration.

16. A control system according to claim 14, wherein said step of applying said first and second control signals and performing a speed changing operation includes applying said first control signal comprising a release oil tank pressure when said clutch means is moved beyond a certain amount toward said shut-off condition during vehicle deceleration.

17. A method of controlling a continuously variable transmission in a vehicle with an engine for continuously varying a speed ration of said transmission according to an indication of a driver's intention of acceleration or deceleration and an indication of engine power output, and for transmitting the engine power output to a wheel dependent on the operation of clutch means for selectively transmitting and shutting-off said engine power to said wheel, the method comprising the steps of:

detecting and feeding back the operating condition of said clutch means for the control of the transmission, and     performing a speed changing operation of the transmission more quickly when the clutch means is operated toward said shut-off condition during a condition of vehicle deceleration than when an ordinary speed changing operation is effected by the transmission.

* * * * *

UNITED STATES PATENT AND TRADEMARK OFFICE
CERTIFICATE OF CORRECTION

PATENT NO. : 5,016,492
DATED : May 21, 1991
INVENTOR(S) : Iino

It is certified that error appears in the above-identified patent and that said Letters Patent is hereby corrected as shown below:

IN THE CLAIMS:

Claim 11, column 19, line 42 after "clutch" insert -- means --.

Claim 14, column 20, line 23 change "the" to -- to --.

Signed and Sealed this

Third Day of August, 1993

Attest:

MICHAEL K. KIRK

Attesting Officer

Acting Commissioner of Patents and Trademarks